May 5, 1936. W. E. ROONEY 2,039,350
FISH CANNING MACHINE
Filed Sept. 5, 1934 7 Sheets-Sheet 1

Fig.1

INVENTOR
Walter E. Rooney
BY Ivan D. Thornburgh
Charles H. Cripe
ATTORNEYS

May 5, 1936.  W. E. ROONEY  2,039,350
FISH CANNING MACHINE
Filed Sept. 5, 1934   7 Sheets-Sheet 5

INVENTOR
Walter E. Rooney
BY
ATTORNEYS

May 5, 1936.  W. E. ROONEY  2,039,350
FISH CANNING MACHINE
Filed Sept. 5, 1934  7 Sheets-Sheet 7

INVENTOR
Walter E. Rooney
BY
ATTORNEYS

Patented May 5, 1936

2,039,350

UNITED STATES PATENT OFFICE 2,039,350

FISH-CANNING MACHINE

Walter E. Rooney, Bellingham, Wash., assignor to American Can Company, New York, N. Y., a corporation of New Jersey Application September 5, 1934, Serial No. 742,864

20 Claims. (Cl. 17—4)

The present invention relates to fish canning machines which receive, feed and cut up whole fish into can lengths and thence compress and pack the same into cans and has particular reference to mechanism for presenting and holding the whole fish for the cutting operation and further feeding the cut fish in a selected manner whereby compensation is made for variation in the size of fish.

The invention contemplates operation in a fish canning machine of the general type disclosed in my pending application Serial Number 665,950, filed in the United States Patent Office April 13, 1933, on Fish canning machine.

An object of the instant invention is the provision of a fish canning machine having a synchronized whole fish feed and a fish cutting mechanism which cooperates to insure the delivery of cut fish in substantially uniform quantities, the relationship between feeding and cutting being altered at will to compensate for variations in the size of the fish being canned.

Another object of the invention is the provision of holding devices in fish canning machines for positively handling the whole fish prior to and during the cutting of the same so that any slipping or shifting of the individual fish is prevented and a definite relationship is maintained between the individual fish during their advancement to the cutter.

Still another object of the invention is the provision of fish carrier and table gates in a machine of the character described for feeding whole fish in a step by step movement, each fish when deposited on the carrier being positively held thereon, the carrier advancing a predetermined number of times and for the same number of cutting actions before more fish is fed.

A further object is the provision of a timed fish feed and cutting mechanism which may be set at will to present a fish for cutting and which will make a predetermined number of cuts upon the individual fish so presented, the setting being made in accordance with the size of the fish.

Another object of the invention is the provision of improved fish holding and self-compensating devices effective on both sides of a cutter so that no slipping of the held fish can take place during the cutting action, holding adjustment being automatically made to allow for the size of fish being held.

The invention also contemplates a fish supporting feeding and cutting mechanism for progressively introducing fish into fish feeding elements and for cutting into can lengths, each introduction of fish being made only when the fish preceding has been brought under proper control and is being cut according to a definite plan.

Still another object of the invention is the provision of safety devices associated with fish introducing elements of the character described, so that only properly positioned fish are presented for cutting and so that any danger to the operator in the initial feeding of the fish is obviated.

The invention is further concerned with whole fish feeding and cutting and cut fish compressing and transferring devices operating to provide a uniform compression of the cut fish.

Numerous other objects and advantages of the invention will be apparent as it is better understood from the following description, which, taken in connection with the accompanying drawings, discloses a preferred embodiment thereof.

Referring to the drawings.

The apparatus disclosed in the drawings, and which constitutes a preferred embodiment of the present invention, is concerned with the forward end of a fish canning machine of the type disclosed in my pending application referred to above. The necessary rear end of the complete fish canning machine which receives the cut fish in a feeding tunnel and further disposes of it to produce the finally canned product is not shown in the present drawings nor are the subsequent fish handling operations further described as they form no part of the instant invention.

The operations taking place in the forward end of the machine (these correspond broadly to the first division set forth in the description of the reference application) are concerned with the proper feeding of whole fish which have been previously cleaned and head and tail removed, cutting the same into can lengths and compressing together the cut lengths and feeding them along a feeding tunnel. These steps and the machine parts involved in their performance will now be set forth in some detail and further defined in the appended claims.

The apparatus comprises a fish carrier intermittently moved which consists in this embodiment of four parallel chains 31 which carry spikes 32 and which pass through a feed trough 33. These chains receive fish from a feed table 34 at a predetermined interval of time and the fish are then conveyed by the chains into the mouth of a feeding tunnel 35 where can lengths of fish are cut off from the whole fish.

Provision is made for supporting the fish above the carrier chains 31 and the operator takes the fish from the feed table 34 and places it on sliding table gates 36, 37 for this purpose. These gates are closed at such a time and support the fish until the chains passing through the trough are brought to rest and into the proper position to receive it. The timing of the opening of the table gates so that a fish drops into the carrier chains is in part manually controlled by an adjusting device broadly indicated by the numeral 38.

Each setting of this device insures that the table gates open after a certain number of cutting cycles have been made and after the chains have made the same number of forward movements. For example, a large fish may require five cuts to divide it into can lengths, a small fish may need only three cuts. It is for this timed opening of the gates 36, 37 that the hand control device 38 is selectively set.

When a fish falls on the spikes 32 of the carrier chains 31, it is pressed down firmly in position and held on the chains by two sets of holding fingers 41 which move in from above the fish and from both sides of the trough 33. These fingers press the fish down against and impale it on the spikes of the chains and then, as the chains move forward on the next step advance, the fingers still in holding position also move forward with fish and carrier. The forward end of the fish string is thus repeatedly presented to a cutting operation effected by a rotary cutter 42 operating adjacent the mouth of the tunnel.

During the cutting of the fish, which takes place at the rest period of the chains, the holding fingers move up and away from the fish and thence back into a new position ready to repeat for the next step movement of the carrier chains.

The table gates 36, 37 are moved out for a fish depositing action by the cooperation of cam and slide actuating devices which will be hereinafter fully explained. These gates are returned into fish supporting position through a yieldingly actuating connection so that should the operator get his hand in between adjacent edges of approaching table gates, the yielding elements allow for stopping of gate movement, thus preventing injury. A misplaced fish has the same effect in stopping movement, the yielding feature thus making a safety device.

As the forward end of the fish line enters into the entrance of the tunnel 35, this being at the end of the feed trough 33, it passes into the influence of pressure members 43 which move down and engage the fish as soon as the carrier chains 31 come to rest. These pressure or clamping members are yieldingly actuated and are self-compensating as to their degree of movement so that a fish is always correctly engaged and held by them irrespective of its size.

Pressure members 43 just mentioned are located just outside of the tunnel 35 and back of the rotary cutter 42. The forward end of the fish which projects into the tunnel is beneath a vertically movable grill clamp 44 which also acts to hold it for cutting. The grill clamp is in front of the rotary cutter 42. The actuation of this grill is also yieldingly effected so that it is also self-adjusting for the size of fish being held. The cooperation of the pressure members 43 on the one side of the circular cutter and the holding grill 44 on the opposite side insures a greatly improved holding of the fish during the cutting action.

As in the apparatus of my previous invention already referred to, the cut fish within the tunnel are compressed and fed forward by a feeding fork. In the present embodiment this fork, designated by the numeral 45, is additionally controlled during its movement by a dash pot unit 46 which cooperates with a crank element 47 and a cam actuating member 48 for insuring a more accurate and even pressure on the fish mass within the tunnel 35.

The fish as it is compressed within the tunnel is further measured out and filled into cans in any suitable manner as is shown in my previous invention referred to above. A more detailed description now follows of these parts and the various operations which have been already briefly mentioned and such description will follow substantially the same order of sequence.

*General construction*

A number of the machine parts are carried in or upon a base housing 50 (Figs. 1, 2 and 3) which is supported by legs 51. To one side of the housing is secured a cam housing 52 which at its outer end is supported by a column 53 and this housing indirectly supports the feed table 34 on which the whole fish are received and from which they are handled. The feed table is formed in two parts 54, 55 located above and to the sides of the feed trough 33.

Table 54 (Figs. 2 and 12) is formed with an outer vertical wall 56 and an inner wall 57 and is supported directly upon a bracket 58 which in turn is mounted on and bolted to the cam housing 52. Bracket 58 may be an integral part of the feed trough frame 33. Table 55 like its companion table 54 is also formed with parallel spaced walls which include an inner wall 61 and an outer wall 62 and is supported upon a bracket extension 63 which is secured to or may be an integral part of one side of the feed trough frame 33.

The space between the table walls 57, 61 provides a fish receiving channel 64 the bottom of which is normally closed by the sliding table gates 36, 37 and it is into this channel that the fish is placed by the operator. Channel 64 therefore may be considered an extension of the top part of the feed trough 33 but is normally separated from the trough by the table gates.

There will be some variation between the individual fish even in a single batch or run and in placing the fish into the receiving channel, the operator endeavors to get about the same amount of fish each time. In the case of a large fish doubtless a single fish will meet the requirements, or one feeding action may have one large and a small fish and the next possibly two medium fish or again maybe three small ones. This is at all times controlled by the operator and a relatively good average supply is all that is needed as other parts of the machine handle the small variations.

Feed trough 33 into which the fish drop when the gates are opened consists of a bottom 65 and vertical side walls 66. The rear end of this trough may be partially closed by a plate 67 (see Figs. 5 and 12) which holds the side walls of the trough together, the trough at this end being carried by the bracket 58 and the cam housing 52.

At the forward end, the feed trough 33 (Fig. 3) is supported directly upon a feed housing 68. Housing 68 (see also Fig. 2) is mounted directly upon the base housing 50 and extends up and encloses the forward end of the trough and the forward ends of the carrier chains 31. This housing also directly supports the tunnel 35. Attention will now be given to the carrier chains 31.

*Fish carrier chains and holding fingers*

The carrier chains 31 (Figs. 3, 5 and 12) are mounted to operate horizontally with their upper runs passing through the trough 33. For this purpose the trough bottom 65 is provided with four parallel grooves 71 along which the chains ride. The spikes 32 of the upper chain runs extend up and in fish receiving and holding position while passing along the trough bottom.

Figure 3:
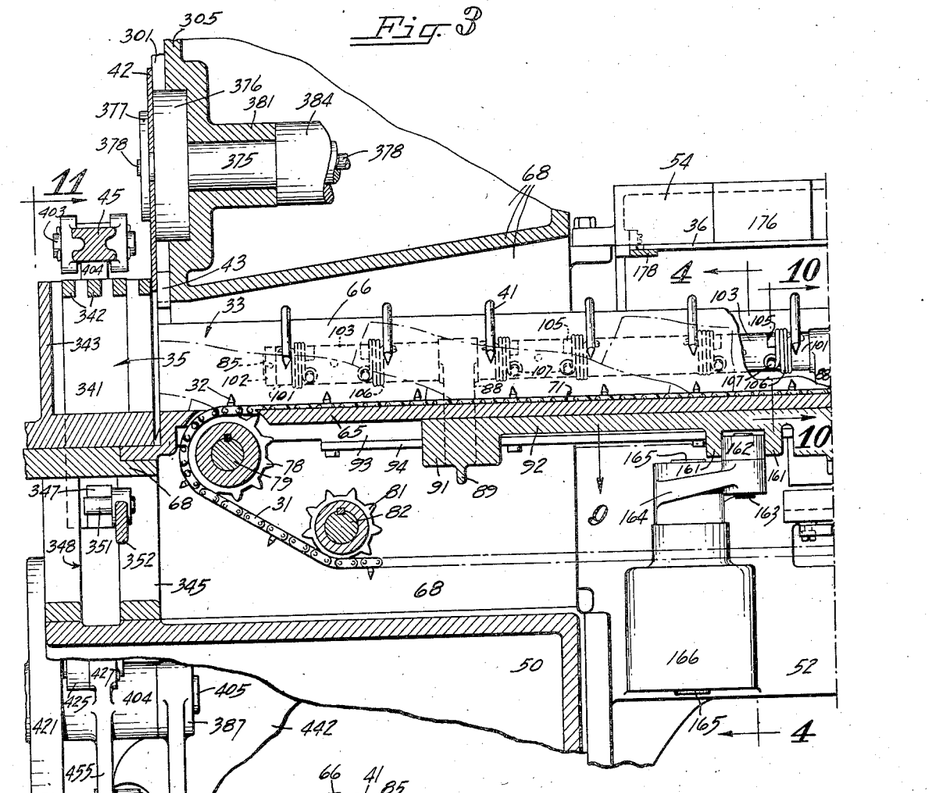
Fig. 3 is a longitudinal sectional view taken through the forward end of a feed trough of such a machine as viewed substantially along the line 3—3 in Fig. 1, this view being on an enlarged scale.
Figure 5:
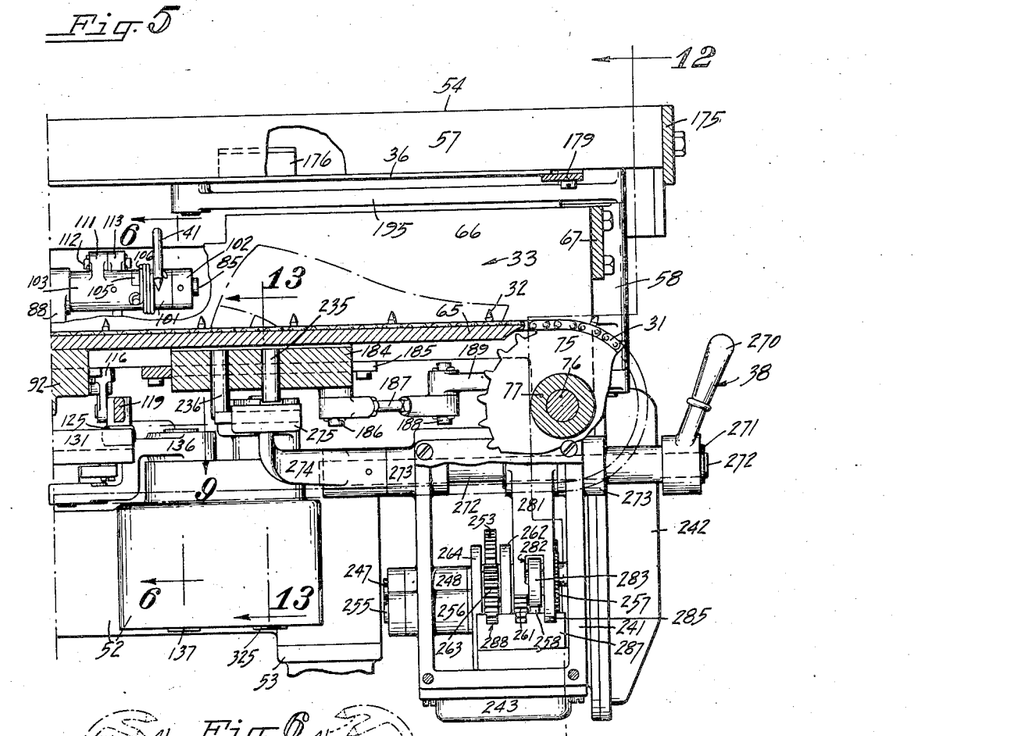
Fig. 5 like Fig. 3, is a sectional view drawn to the same scale and taken along the same section line 3—3 in Fig. 1 but showing the rear end of the trough, Figs. 3 and 5 when joined together along their respective dot-and-dash lines completing the full longitudinal section of the trough and associated parts.
Figure 12:
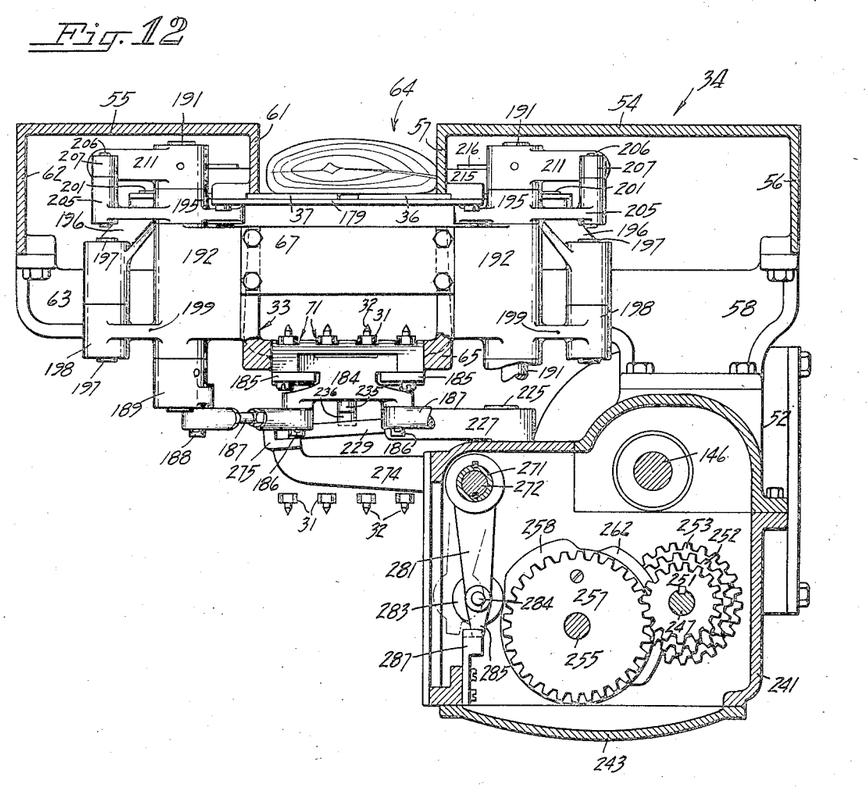
Figs. 12 and 13 are transverse sectional views taken respectively along the broken lines 12—12 and lines 13—13, both in Fig. 5.
Figure 13:
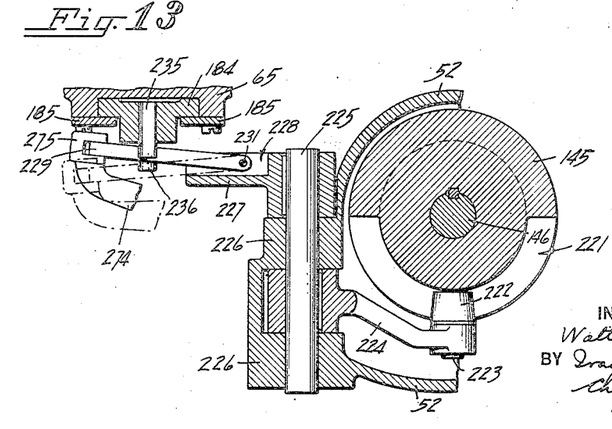

The chains 31 at the rear pass over idler sprockets 75 which are rotatably mounted on a horizontal shaft 76 carried in bearings 77 depending from the side walls of the trough. At their forward ends the chains pass over and are driven by sprockets 78 which are mounted on a horizontal shaft 79. This shaft is mounted in bearings formed in the housing 68 and is intermittently rotated in any suitable manner. The chains 31 also pass over tightener sprockets 81 which are keyed to a horizontal shaft 82 journaled in bearings formed in the frame housing 68.

The holding fingers 41 are mounted in pairs on opposite sides of the trough 33, all of the fingers on one side of the trough being mounted on a horizontal rock shaft 85 (Figs. 3, 5, 6 and 10). The fingers on the opposite side are similarly mounted upon a rock shaft 86 (see also Fig. 2).

Shafts 85, 86 besides having a rocking action are moved bodily back and forth to cause the finger advancement to cooperate with the forward advance movement of the carrier chains. For this purpose the shafts are carried in the upper ends of arms 87 of a pair of U-shaped yokes 88, a connecting arm 89 of each yoke extending below the trough bottom 65. Each arm 89 is joined by an extension 91 to a finger slide 92. Slide 92 is mounted for sliding movement within guideways 93 formed in the trough bottom 65, slide plates 94 which are bolted to the bottom, retaining the slide in working position.

Each finger 41 is carried in a collar 101 which is loosely mounted on its respective rock shaft 85, 86. The finger collars 101 of the end fingers on each side are mounted adjacent a stop collar 102 which is pinned to its respective rock shaft. Between adjacent finger collars 101 are located spacer sleeves 103 which are also pinned to their respective rock shafts.

A lap joint connection 105 (Figs. 3 and 5) is formed between each finger collar 101 and its associated spacer sleeve 103 and provides a loose slide joint which allows a slight turning movement between collar and sleeve. A coil spring 106 is mounted adjacent each of the joints 105 and one end of the spring is hooked over a pin 107 projecting out from the sleeve 103 while its opposite end is similarly hooked over the holding finger 41.

This construction insures that the fingers 41 normally rest in the same forward position on their associated rock shafts 85, 86 and come down together with the shafts when the latter are oscillated. Each finger, however, has an independent yielding movement relative to its rock shaft permitting it, when brought down on the fish on the carrier chains 31, to seek a proper holding position as necessitated by the particular size of fish engaged. This feature adapts the fingers for self-adjusting holding action on the fish and at the same time allows for a simple actuation by mere oscillation of the rock shafts. Movement of the rock shafts will next be considered.

One of the spacer sleeves 103 on each rock shaft is formed with an arm 111 (Figs. 2, 5, 6 and 10) which is pivotally connected at 112 to a link 113, the lower end of which is pivotally connected at 114 to an arm 115 of a bell crank lever 116. The two bell crank levers are each mounted on a shaft 117 which is supported in an extension of the arm 87 of the yoke 88 and are mounted in slightly different positions. This mounting is arranged so that a single actuating movement simultaneously raises both sets of fingers 41 into non-engaging position (indicated in the dot-and-dash lines of Fig. 6) or into fish engaging position shown in full lines in Figs. 6 and 10.

A second arm of each bell crank lever 116 is pivotally connected at 118 to the end of a bar 119 which extends crosswise and below the finger slide 92 being also below the bottom of the trough 33. It is the shifting of this bar 119 to the right as viewed in Fig. 6 which lowers the fingers into fish engaging position and shifting to the left which raises the fingers into their upper or non-engaging positions.

For actuating the bar 119 a cam roller 125 is rotatably mounted on a pin 126 carried in and projecting down from the bar. This roller moves back and forth within a channel 127 being in unison with the movement of the feed slide 92 and with the fingers 41. This will become more apparent as the description proceeds.

Figure 6:
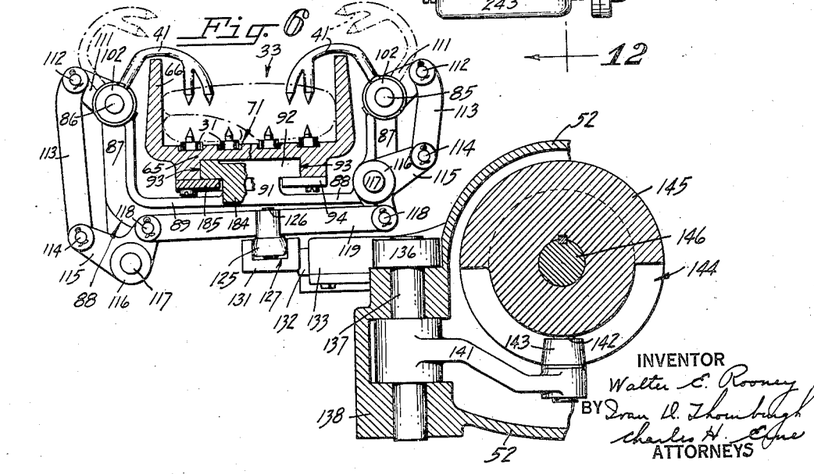
Fig. 6 is a transverse sectional detail partly broken away as viewed along the section line 6—6 in Fig. 5.

When in the forward end of channel 127, the fingers 41 are raised out of the trough 33 by a shifting lateral movement of the channel 127, this being toward the left (Fig. 6). The roller 125 is in the rear end of the channel when the reverse action takes place. In other words channel and roller are shifted toward the right, which action brings the fingers into fish engaging position.

The channel 127 is formed within a U-shaped block or head 131 (Figs. 6 and 9) which is an integral part of a slide member 132 mounted for sliding movement within a bearing 133 formed in the cam housing 52. Slide member 132 carries a pin 134 which extends down and is loosely engaged in the bifurcated end 135 of a lever arm 136 which is secured to the upper end of a rock shaft 137 mounted in bearings 138 formed in the cam housing 52.

The rock shaft 137 also carries a lever arm 141 which supports a pin 142 at its outer end. A cam roller 143 is rotatably mounted on the pin 142 and operates in a groove 144 of a double barrel cam 145 (see also Fig. 2). This gives the rocking movement to the fingers 41.

The double cam 145 is keyed to a horizontal cam shaft 146 which is mounted for rotation in bearings 147 formed in the cam housing 52. One end of the shaft 146 carries a bevel gear 148 which meshes with a similar gear 149 carried on a power shaft 151 which may constitute one of the principal driving shafts of the apparatus.

Figure 4:
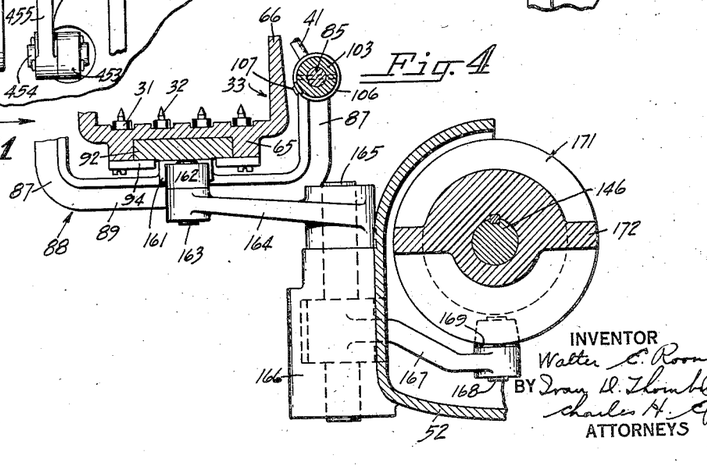
Fig. 4 is a fragmentary transverse sectional view taken substantially along the line 4—4 in Fig. 3.

Actuation of the finger side 92 for moving the fingers 41 with the chains 31 is effected by means of a cam also associated with the cam shaft 146. The slide 92 (Figs. 3 and 4) is formed with depending parallel spaced ribs 161 (see also Fig. 9) which provide confining walls for a cam roller 162 rotatably mounted on a pin 163 carried on the outer end of a lever arm 164. This arm is secured to the upper end of a vertical rock shaft 165 which is mounted in bearings 166 formed in the cam housing 52.

The rock shaft 165 also carries a lower lever arm 167 the free end of which carries a pin 168 on which a cam roller 169 is mounted. The roller 169 (see also Fig. 2) operates within a cam groove 171 formed in a barrel cam 172 keyed to the cam shaft 146 and mounted adjacent the double cam 145.

The effect of cam 172 acting through the connections just described is to produce a forward and back movement of the finger slide 92 which in turn carries the holding fingers 41 forward when they are down and holding the fish on the carrier chains 31, this during the advance movement of the latter. On the return or back stroke the slide carries the fingers back into a new position for subsequent fish engagement.

*Table gates*

Figure 1:
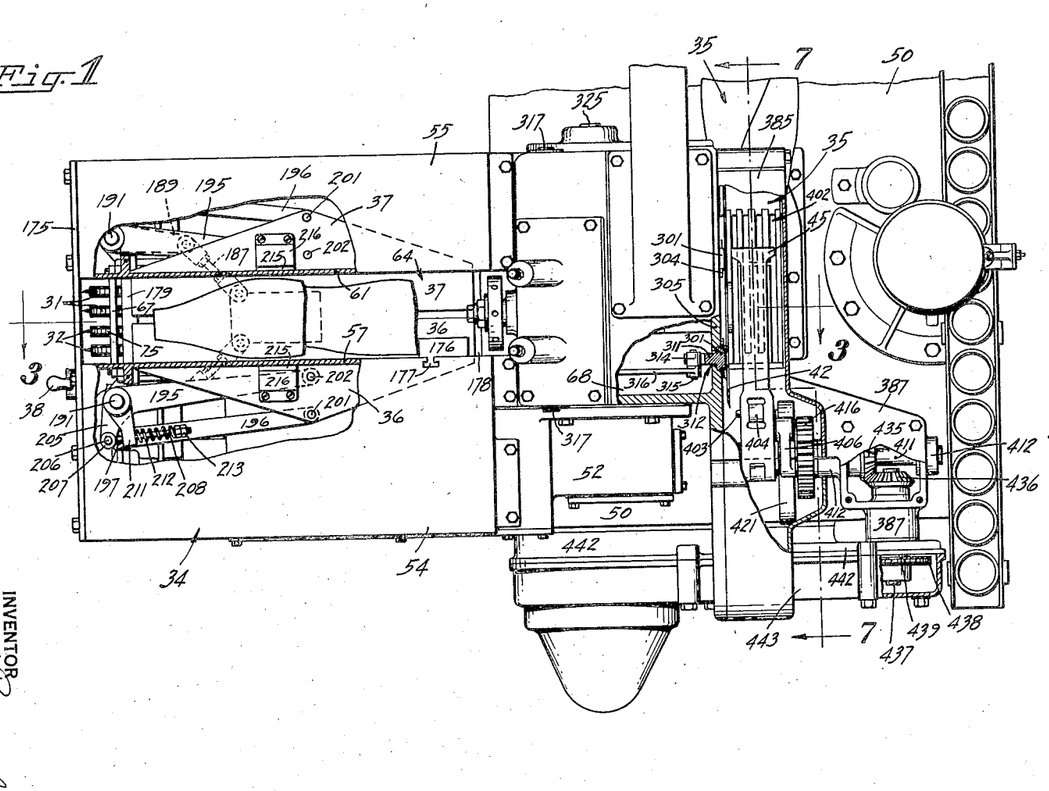
Figure 1 is a plan view partly broken away of a fish canning machine embodying the present invention.

The broad function of the table gates 36, 37 in supporting the fish placed in the channel 64 is doubtless fully understood. A more detailed description will now be given of the actuation of these gates including their separation to permit dropping of fish onto the carrier chains 31 and their closing preparatory to a subsequent feeding action. Reference should now be had to Figs. 1 and 5.

The outer or rear ends of the tables 54, 55 are joined together by a connecting plate 175 and at their forward ends and located within the channel 64 provision is made for roughly gauging the position of a fish placed within the channel. For this purpose a gauge block 176 (see also Fig. 3) is mounted within the channel, being detachably secured to the inner wall 57 of the table 54 by a tongue and groove joint 177. The operator in placing fish within the channel 64 brings the large end of the fish against this block.

If the fish is sufficient in size so that it practically extends the full length of the channel 64 only one fish will be so placed. In the event, however, that the fish run smaller two or even three fish may be positioned in the channel at the same time for a single feeding operation. In Fig. 1 of the drawings two of the medium size fish are indicated as being located within the channel and as resting upon the table gates 36, 37.

Both gates are supported at their front and rear ends, the front ends of the two gates resting upon a plate 178 (Figs. 1 and 3) which is secured to the under side of the tables 54, 55 and the opposite ends of the slides are similarly supported on a plate 179 (Figs. 1 and 5) also carried by the tables and also projecting across the open space between the tables.

The table gates 36, 37 are separated to open or clear the bottom of the channel 64 by movement of a gate slide 184 (Figs. 5, 6, 12 and 13) which is mounted within one end of the trough guideway 93, this slide being at the rear end of the trough while the finger slide 92 already described is in the same horizontal plane but at the forward end of the trough. Slide 184 like slide 92 is supported in sliding position by slide plates 185 which, like plates 94, are also bolted to the bottom of the trough.

The gate slide 184 at its rear end carries a pair of spaced depending pins 186 (Figs. 5 and 12) and an adjustable link 187 is pivotally connected with each pin. The opposite end of each link 187 is pivotally mounted on a pin 188 which is carried by a lever arm 189 secured to the lower end of a vertical rock shaft 191. Each shaft 191 is carried in a bearing 192 formed in the bracket 58 on one side and in the bracket 63 on the opposite side.

The shafts 191 form supports for part of a system of parallel levers, there being two parallel levers for each table gate. An inner lever 195 (Figs. 1 and 12) is loosely mounted on each shaft 191, each of these levers resting directly on the tops of the bearings 192. An outer lever 196 is loosely mounted at one end on a vertical shaft 197 which is carried in a bearing 198 secured to a bracket extension 199 which is an integral part of the bearing 192.

The levers 195, 196 on each side of the machine remain in parallel at all times throughout the sliding movement as well as the rest period of the table gates 36, 37. Levers 195, 196 are pivotally connected at their forward or free ends to pins 201, 202 carried by the table gates. Each inner lever 195 is formed with a short arm 205 the outer end of which supports a pin 206. A block 207 is loosely mounted on the pin and a rod 208 has one end connected to the block 207.

Each rod 208 extends above and is parallel to the lever 196 and passes in a loose sliding connection through the outer end of an arm 211 which is secured to the upper end of the shaft 191. A spring 212 is mounted on each rod 208, one end bearing against the arm 211. Its other end is confined by locknuts 213 threadedly secured to the end of the rod. This construction provides a yielding connection for swinging the levers 195, 196 on their associated shafts 191, 197 during normal movement of the table gates 36, 37.

In the event, however, that the operator gets his hand in between the inner edges of the table gates as they are being moved in by rocking movement of the shafts 191, the springs 212 yield sufficiently to permit completion of the rocking movement of the arms 211 and shafts 191 without a corresponding movement of the table gates and without any injury to the operator. This yielding or safety provision also provides against a misplacement of fish in the channel 64 for should the fish become jammed between the approaching walls 57, 61 of the feed tables 54, 55 during a premature fish feeding operation the table gates remain in stationary position and hold the fish until the right time, thus insuring correct feed and also preventing damage to the machine.

Each table gate 36, 37 carries a rubber stop unit which consists of a rubber block 215 which is partially confined in a clamp plate 216 mounted on the upper surface of the gate and screwed to it. The inner side of each rubber block 215 projects beyond its confining clamp plate and when the gates 36, 37 reach their inner fish supporting positions their blocks strike against the respective table walls 57 and 61. This feature provides a definite location for the gates and prevents jar or shock to the machine.

The table gate slide 184 is actuated at the termination of a predetermined number of advance movements of the carrier chains 31 as has already been referred to, and the settings are made by manual operation of the control device 38. The gate slide movement for any one setting is brought about by connection with the cam shaft 146.

Figure 9:
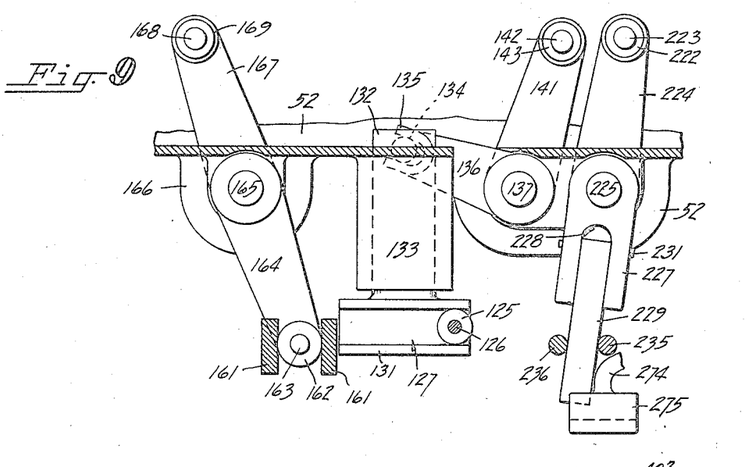
Fig. 9 is a fragmentary plan sectional view taken along the combined section lines 9—9 in Figs. 3 and 5.
Figure 10:
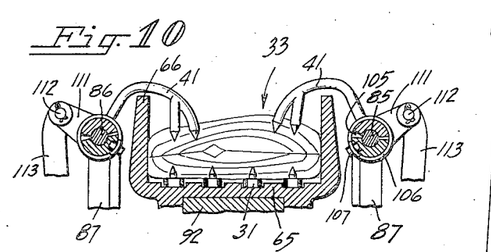
Figs. 10 and 11 are transverse sectional details taken substantially along the lines 10—10 and 11—11 in Fig. 3.

For this purpose the double cam 145, which is keyed to and carried by the cam shaft 146, is formed with a second cam groove 221 (Figs. 2 and 13) in which a cam roller 222 operates (see also Fig. 9). The roller 222 is rotatably mounted on a pin 223 which is carried in the free end of an arm 224 which is keyed to the lower end of a vertical rock shaft 225 located in bearings 226 formed in the cam housing 52.

For each complete rotation of the cam shaft 146 with the barrel cam 145, the shaft 225 is rocked back and forth, this timed movement corresponding to one cycle of advance movement of the carrier chains 31. The upper end of the shaft 225 carries an arm 227 which extends out from the shaft to a position below the gate slide 184. This arm is slotted or bifurcated at 228 and the inner end of a trip bar 229 is located in the slot, being pivotally mounted on a pin 231 carried by the arm.

During those cycles that the table gates 36, 37 remain closed the bar 229 passes back and forth under the gate slide 184 without moving it. At such time this bar is held in a lower position (disclosed in dot-and-dash lines Fig. 13) and free of the slide and other parts connected therewith. Provision is made for raising the bar 229 into the full line position of Fig. 13 when it is time for the gate slide 184 to be operated.

In raised position the bar 229 comes in between a short depending rear pin 235 (Figs. 5, 9 and 13) and a longer depending front pin 236, both pins being carried by the gate slide. The bar is held in the raised position for one complete reciprocation of the arm 227 and at that time the gates 36, 37 are first separated to permit dropping of the fish into the feed trough and onto the carrier chains and are then closed or moved back into fish supporting position to receive other fish.

In the present embodiment as shown in the drawings, the mechanism which raises and holds the bar 229 into engagement with the gate slide pins 235, 236 comprises three different units any one of which may be utilized as desired. One gives an actuating time of one table gate operation for three chain advance movements, or in other words, allows for three cuts by the cutter 42 before a succeeding fish is dropped into place within the feed trough. The second unit gives a timing equivalent to a table movement for every four cuts and the third for every five cuts. The manual setting of the adjusting device 38 selectively brings into operation the desired unit.

Most of this mechanism is contained within a gear housing 241 (Figs. 2, 5 and 12) which is bolted to and carried by the cam housing 52. A cover plate 242 secured to the gear housing closes one end of the same and a bottom plate 243 is also secured to the bottom of the gear housing.

The rear end of the cam shaft 146 extends into the gear housing 241 and carries a gear 245 which meshes with a gear 246 secured to an auxiliary gear shaft 247 which is parallel to the shaft 146 and is journaled in bearings 248 formed in the gear housing. The shaft 247 carries a gear unit which is keyed to the shaft and which comprises gears 251, 252, 253, each gear being associated with one of the selective bar raising units previously mentioned.

An auxiliary cam supporting shaft 255 is located within the gear housing 241 and is parallel to the gear shaft 247 and is held stationary in bosses 256 formed in the gear housing. Shaft 255 carries a gear 257 which meshes with the gear 251 and a cam 258 is screwed to the gear 257. This gear and cam form the third timing unit referred to above which is rotated at a given speed on the stationary shaft 255 by reason of the ratios between the gears 251, 257. This is the slowest of the units and corresponds to the five-cut interval for the table gates.

Shaft 255 also carries a second gear 261 which meshes with the gear 252 and this is associated with a cam 262. This gear and cam form the second or intermediate unit which by reason of the gear ratio between the gears 252, 261 rotates on the stationary shaft 255 at a different and higher speed from that of the first unit and corresponding to the four-cut table gate interval.

In a like manner a third gear 263 is loosely mounted on the shaft 255 and this gear meshes with gear 253 and is associated with a third cam 264. This constitutes the first unit mentioned above and corresponds to the three-cut table gate interval, this unit rotating at the fastest speed. All three units rotate continuously as long as the apparatus operates and each unit makes one complete revolution of its cam for the interval corresponding to its particular timing.

Only one unit is in active connection with the bar 229 at any one time and its selection is made through the hand control device 38 which will now be considered. The manual setting of the device is made by shifting of a handle 270 (Fig. 5) which is mounted on and keyed to a sleeve 271 carried on and keyed to a slide shaft 272.

Sleeve 271 and shaft 272 slide in bearings 273 formed in the gear housing 241 and the inner end of the shaft carries a lever 274 (see also Figs. 12 and 13) which is formed with a slotted head 275 in which the outer end of the bar 229 is located. The sleeve and shaft have three longitudinal positions, the outermost position being disclosed in Fig. 5. In its innermost position, the handle 270 on the end of the sleeve engages the outer bearing 273. In all of these positions the bar 229 is confined within the slotted head 275 of the lever 274.

The bar 229 is brought into the gate slide actuating position and in between the pins 235, 236 by oscillation of the shaft 272. This oscillation is automatically made by the operation of one of the cams 258, 261, 264 after the desired unit has been selected. For this purpose the inner end of sleeve 271 (Figs 5 and 12) carries a depending transmission lever 281 which is slotted at 282 for clearance of a roller 283 rotatably mounted on a pin 284 carried in the lower end of the lever and extending across the slot 282.

The transmission lever is formed with an extension 285 along one side of the slot 282 which acts as a key for locating the lever in one of the three selected positions as determined by the handle 270. A key locking plate 287 is provided with slots 288 which are adapted to receive the extension 285 and hold the lever in a set position.

In setting the adjusting device 38 the shaft 272 and sleeve 271 are first rocked by the handle 270 until the transmission lever 281 is moved out at its lower end into the position indicated by the dot and dash lines of Fig. 12, and in this position the extension end 285 is free of the plate 287.

The shaft, sleeve and lever are then moved longitudinally until the lever end 285 is brought opposite to the slot 288 in the plate 287 that is associated with the desired cam unit. The handle 270 is then thrown back bringing the lever 281 into vertical position (indicated by the full line disclosure of Fig. 12). The lever extension 285 is then within the proper slot and the roller 283 is in engagement with the desired cam.

With the parts so set, the lever 274 carried by the shaft 272 is raised in proper time to lift the bar 229 into actuating position between the pins 235, 236 when the lever 281 moves toward the left (Fig. 12) under actuation of the cam. The lever extension 285 does not leave the slot 288 during such movement. The lateral shifting of the bar 229 by operation of the cam groove 221 (Fig. 13) thereupon brings about the cycle of operation of the table gates.

In the position illustrated in Fig. 5 it will be observed that the roller 283 is in engagement with the periphery of the cam 258 and, since this cam belongs to the five-cut unit as long as this setting obtains, the table gates will be separated and fish will be deposited on the carrier chains for every fifth cut made by the cutter 42. When the other units are brought into play by the selective setting of the lever 281 the particular gate interval associated therewith takes place in like manner.

*Pressure members*

When the forward end of the fish string has entered into and come to rest within the tunnel 35, the fish is engaged by the pressure members 43. These members consist of two vertically disposed elongated bars 301 (Figs. 2 and 7) each of which is provided with a fish engaging foot section 302 the lower end of which is serrated at 303.

Each bar 301 slides in a vertical guideway formed between side plates 304 which are screwed against a front wall 305 in the upper part of the feed housing 68. The foot 302 of each bar projects into the top of the tunnel when the bars are moved down into fish holding position, this being on the feed-in side of the cutter 42. Both bars are moved down simultaneously at the beginning of their clamping stroke, this being under control of a reciprocating lever arrangement best disclosed in Figs. 1, 2 and 7.

Each bar 301 carries a block 311 which extends to the rear and is located in an elongated vertical slot 312 cut in the wall 305. Each block 311 is slotted at 313 for the reception of a roller 314 rotatably mounted on a pin 315 which in turn is carried on the free end of a lever arm 316. Each lever arm is loosely keyed to a horizontal rock shaft 317 and is confined within the upper part of the feed housing 68. By loosely keyed is meant that the key in the shaft has some play in a slot 318 formed in the hub of the lever arm.

Rock shaft 317 oscillates in bearings (Figs. 1 and 2) formed in the side walls of the housing 68. This shaft also carries an arm 319 (Fig. 2) which is secured to it and moves with the shaft at all times. This arm carries a pin 321 and a roller 322 is rotatably mounted on the pin and rests upon a peripheral cam section 323 of a gear cam unit. This unit also has a gear face 324 and is keyed to and driven by a horizontal shaft 325. This horizontal shaft is journaled in the housing 68 and is rotated in any suitable manner.

The two levers 316 are yieldingly and individually forced down for a fish holding operation so that when the foot 302 of each associated bar 301 engages the fish in the end of the trough 33, the foot bar and lever come to rest in whatever position that may be. This compensates for irregularities and size of fish and in some cases one lever may be high and the other low. At such times the key in the shaft 317 has been brought down and away from the top of the slot 318 in each lever arm hub.

Figure 2:
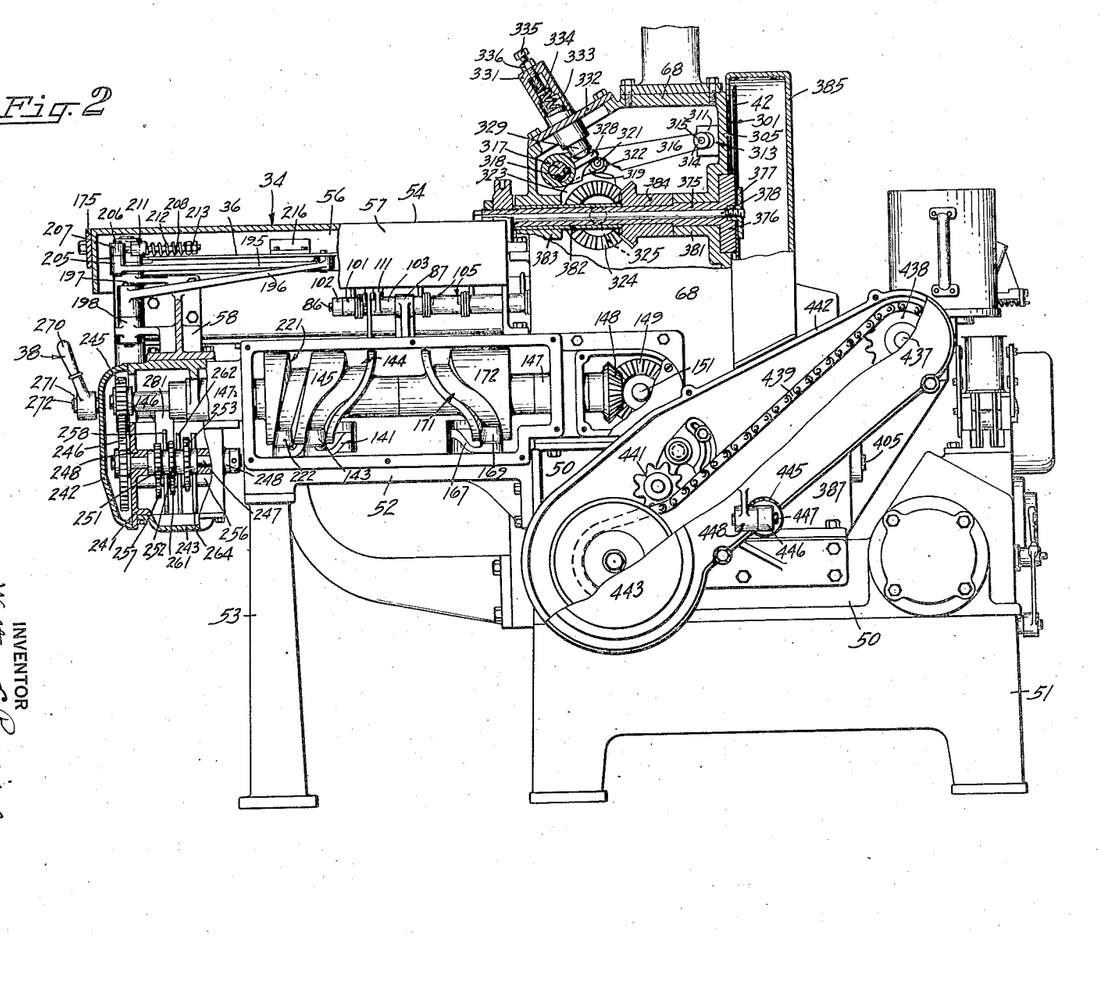
Fig. 2 is a side elevation of the same parts, some of these being broken away and shown in section.

To provide this yielding feature each lever arm is formed with a side projection 328 which extends up at an angle as best shown in Fig. 2. Each side projection is engaged by the lower end of a spring barrel 329 which slides within a tubular boss 331 formed in a cover plate 332 which is mounted on and bolted to the top and at the rear of the housing 68.

Each spring barrel 329 is hollow and one end of a spring 333 extends into the barrel while the other end projects up into the boss where it is engaged by a washer 334 confined in the upper end of the boss and held in spring adjusting position by a setscrew 335. The setscrew is threaded in the end of the boss and is held in adjusted position by a locknut 336. The two springs 333 of the spring barrels 329 individually urge the lever arms 316 into their lowermost position, as has already been described.

The arm 319 which controls the oscillation of shaft 317 rests by gravity or otherwise so that the cam roller 322 rides on the periphery of the cam 323. Cam 323 is cut away sufficiently to locate the key in the shaft 317 at the bottom of the slots in the lever hubs to allow for the lowest positioning of the pressure members 43 on the smallest fish, so that this holding of the fish is always under spring action.

After the cutter 42 has severed a length of fish from the string of fish the cam 323 lifts the arm 319 (Fig. 2), oscillates the shaft 317 counterclockwise and the key in the shaft thereupon picks up the lever arms 316, moving them against the action of their springs 333. This loose connection and spring element thus provide a compensating clamping action for the pressure members and the vertical position of the serrated lower edge 303 of each member during the clamping action is determined entirely by the size of the fish engaged.

*Grill fish clamping device*

Figures 7, 8:
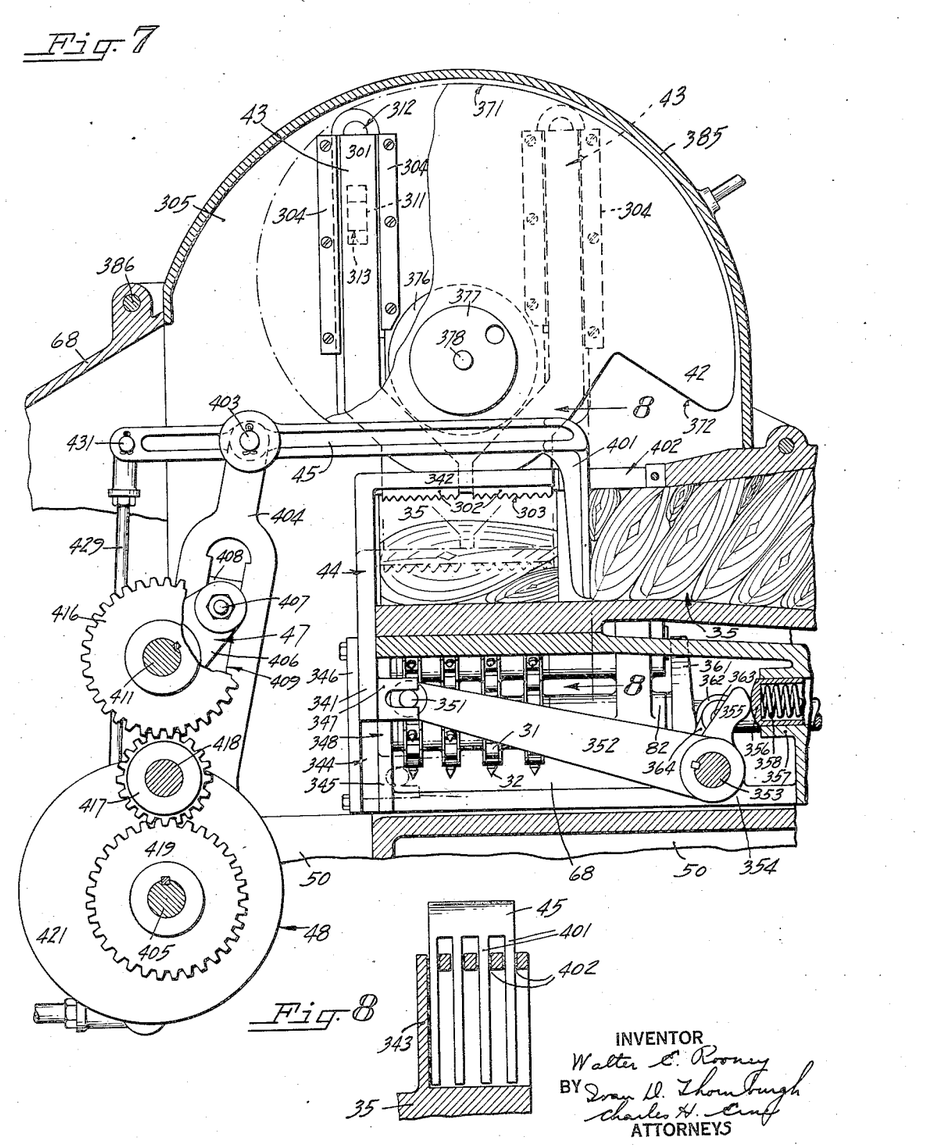
Fig. 7 is a transverse sectional view on an enlarged scale taken substantially along the broken line 7—7 in Fig. 1.
Fig. 8 is a sectional detail taken substantially along the line 8—8 in Fig. 7.

Simultaneously with the holding of the fish by the pressure members 43 on the rear side of the cutter 42 that part of the fish which extends into the tunnel 35 is confined by means of the grill clamps 44. These grill clamps are best illustrated in Figs. 1, 3 and 7 and consist of a vertically disposed body member 341 which is formed with a horizontally disposed top grill section 342. The parts 342 extend over the end of the tunnel 35, which is cut away on the top and the end at this position. A wall 343 on the front of the tunnel 35 provides a stop for the string of fish as it is being introduced into the tunnel and as it is being brought under the clamp sections 342.

The clamp body 341 slides within guideways 344 formed in a web 345 of the housing 68. Guide plates 346 are bolted to the web wall and retain the grill climp in its sliding position. The lower part of the clamp body 341 carries a slotted block 347 which extends through and moves up and down in a vertical slot 348 formed in the web 345. This slotted block is engaged by a pin 351 which is carried on the free end of a lever arm 352.

Lever arm 352 is keyed to a horizontal rock shaft 353 which is mounted for oscillation in bearings 354 formed in the housing 68. The shaft 353 carries a finger 355 (Fig. 7) which is engaged by the end of a spring barrel 356. The spring barrel is mounted to slide within a bearing 357 formed in the housing 68 and is urged forward by a confined spring 358.

The action of the spring 358 is to urge the lever arm 352 down and to pull the grill clamp 44 into a lower position. Any lever movement is limited, however, by the grill extensions 342 coming against the top of the fish within the end of the tunnel. The fish engagement of the grill clamp is thus on the forward side of the cutter 42, that is, on the side opposite to that engaged by the pressure members 43. By reason of this yielding construction the grill clamp action is self adjusting and in accordance with the size of the fish.

After a cutting action has taken place the cut fish resting in the end of the tunnel is released by the grill clamp 44 moving back and up with the rising lever arm 352. Raising of the arm is cam controlled and operates against the action of the spring 358. For this purpose a face cam 361 is mounted on one end of the shaft 82 (Figs. 3 and 7) and its cam surface engages a roller 362 which is carried on a pin 363, the latter in turn being carried in an arm 364 keyed to and movable with the shaft 353. By means of this construction the shaft 82 and its cam 361 pick up and oscillate the lever arm 352 at the right time for releasing the cut fish following the cutting action.

Fish cutting

The cutter 42 is substantially the same as that disclosed in my pending application above referred to and is formed with a cutting edge 371 (Fig. 7). Its periphery roughly follows a spiral curve, the outermost part of which terminates at the end of an inwardly extending wall 372. This shape of cutter allows for continuous movement with intermittent cutting action.

As soon as the wall 372 passes the end of the trough 33 communication between the trough and the tunnel is unrestricted during a time slightly in excess of 90° of cutter rotation. During that time the carrier chains 31 move and insert the end of the fish strip into the tunnel. The cutting edge 371 enters the fish wall slowly and at its top and increases its depth of cut as the cutting continues. This is a feature of the spiral shape of the cutting edge which produces a shear cut.

The cutter 42 is mounted upon the forward end of a sleeve 375 (Fig. 2) which is formed with a head 376 which backs up the cutter adjacent its center. A locking washer 377 formed with a hub projection extends into the opening in the center of the cutter and into the face of the head 376. A tie bolt 378 extends through the sleeve 375 and is threadedly engaged in the washer and locks the cutter 42 onto the sleeve 375.

Sleeve 375 is journaled in a bearing 381 formed in the wall 305 of the housing 68 and extends through a spacer sleeve 382 which in turn is journaled in a bearing 383 formed in the housing. The sleeve 375 and the cutter 42 receive constant rotation by connection with the cam gear units 323 associated with the pressure members 43. For this purpose a gear 384 is secured to the sleeve and meshes with the gear section 324 of the unit.

The cutter 42 is confined within a cylindrical housing 385 (Figs. 2 and 7) which may be hinged at 386 to the housing 68 so that access may be had to the cutter when desired. The housing 385 is also mounted on a feeding fork housing 387 (Figs. 1 and 2) which is carried by the base housing 50. The cutter housing also encloses the pressure members 43, the feeding fork 45 and the grill clamp 44 as well as a part of the end of the tunnel 35.

Fish feeding fork

The fish feeding fork 45 operates in practically the same manner as the corresponding feeding fork of my pending application and in addition is provided with the dash pot unit 46. The fork 45 is formed with prongs 401 (Figs. 7 and 8) which extend into slots 402 formed in the tunnel ceiling at the fish inserting end. The prongs 401 also pass between the bars 342 of the grill clamp 44 as the fork advances after the cutting operation just described. During advancement the cut fish is crowded forward into the tunnel 35.

Figure 11:
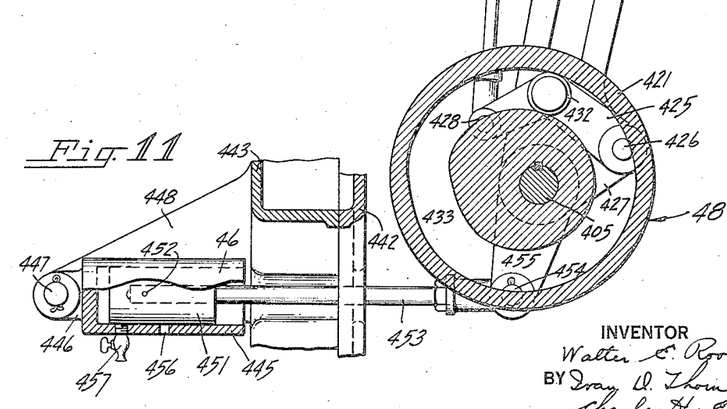

Fork 45 is pivoted on a pin 403 (Figs. 1, 7 and 11) carried in the upper end of an arm 404. This arm is formed at its lower end with a hub section which is loosely mounted on a horizontal rock shaft 405 suitably journaled in the base housing 50.

The fork 45 receives its backward and forward movement by a rocking of the arm 404 on the shaft 405. To effect this motion there is provided a crank arm 406 which is a part of the crank element 47. This crank arm carries a stud 407 which engages a slide block 408, the latter moving up and down in a longitudinal slot 409 cut in the arm 404 as the stud describes a circular path of travel. This rocks the fork forward on a feeding stroke and backward on an idle stroke.

When the fork moves back on its idle stroke its fork end 401 is lifted by a pivoting of the fork on the pin 403. This pivotal movement is effected by the cam actuating member 48, the cam used for the purpose moving with the shaft 405. The crank arm 406 is keyed to the end of a shaft 411 which is journaled in bearings 412 which are formed in the fork housing 387. The shaft 405 is so associated with the crank arm as to insure the proper lifting and lowering of the fork end 401 as the fork rocks back and forth. The shaft 405 drives the shaft 411 through a gear train illustrated in Fig. 7.

A gear 416 is keyed to the shaft 411 and meshes with an intermediate gear 417 which turns on a stud 418 suitably held in the housing 387. This intermediate gear also meshes with a gear 419 keyed to the shaft 405. A face cam 421 (Figs. 7 and 11) is keyed to the shaft 405 and this cam moves as long as the crank 406 operates.

A rocker lever 425 is pivoted on a stud 426 carried in an extension 427 of the arm 404. One end of the rocker lever is pivotally connected at 428 to a connecting rod 429 the opposite end of which is pivotally connected at 431 to the end of the feeding fork 45. The rocker lever carries a cam roller 432 which operates in a cam groove 433 formed in the face of the cam 421.

By means of this construction the lever 425 is rocked up and down by the cam 421 for each cam shaft rotation and the fork 45 is accordingly rocked on its pivot 403. This composite movement of the fork it will be observed is thus derived from the rotations of the shafts 405, 411. Shaft 411 carries a bevel gear 435 (Fig. 1) which meshes with a similar gear 436 mounted on a short shaft 437 carried in a bearing formed in the housing 387.

The shaft 437 at its outer end carries a sprocket 438 (Figs. 1 and 2) over which a chain 439 operates. The chain 439 also passes over a drive sprocket associated with a drive mechanism of the machine. A chain tightener sprocket unit 441 may also be used with the chain to keep it in proper taut position. The chain 439 is confined within a guard casing 442 carried by the base housing 50. A cover plate 443, secured to and carried by the guard casing, may also be used to completely enclose the chain.

The dash pot unit 46 provides a compensating element for keeping the feeding pressure of the fork against the cut fish in the tunnel substantially constant. As the fork 45 approaches the forward end of its feeding stroke the compression of cut fish in the tunnel is at its maximum and this occurs as the crank 406 is passing over its dead center. To relieve some of this pressure on the forward end 401 of the fork, a braking pressure is brought to bear on the fork by being applied to the lower end of the fork support arm 404. A part of this increased pressure is thus counterbalanced by the dash pot unit.

The dash pot unit 46 comprises a cylinder 445 (Figs. 2 and 11) which is formed with a lug 446 that is pivotally connected on a pin 447 carried by a bracket 448 formed as an integral part of the cover plate 443. The inner end of this cylinder is open and a piston 451 is slidably disposed within. This piston is pivotally connected at 452 to the outer end of a piston rod 453, the inner end of which is pivotally connected at 454 to a lower extended end 455 of the arm 404.

When the fork 45 moves back between feeding strokes the piston 451 moves to the right (Fig. 11) and its closed end passes beyond a vent opening 456 formed in the bottom of the cylinder 445. Air flows through this vent and the chamber inside of the cylinder between its closed end and the end of the piston is filled with a no-pressure atmosphere.

A petcock 457 is threadedly engaged in the bottom of the cylinder intermediate its closed end and the vent opening and provides an adjustable restricted or bleed opening for the controlled escape of air from the cylinder chamber when the feeding fork 45 moves on its fish advancing and compressing stroke. In other words when the fork moves forward the piston 451 moves toward the left (Fig. 11) and first blocks off or covers the vent opening 456. The air in the cylinder chamber thereupon becomes compressed as movement continues, this air escaping through the petcock 457 as fast as it can.

The amount of opening made available through the petcock is adjusted to regulate the time involved in the escape of air and to provide the desired counterbalance. It will be observed that this increases in exact proportion to the back pressure developed in the compressed fish within the tunnel so that the pressure developed by the dash pot unit increases to a maximum at the extreme forward end of the fork feeding stroke, which takes place as the crank 406 passes over its dead center.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish canning machine, the combination of a feeding tunnel, an intermittently movable carrier arranged transversely of said tunnel for advancing fish into said tunnel, a cutter adapted for operation transversely of the line of travel of said carrier during its rest period to cut the fish into can lengths, and means moving simultaneously with said carrier for holding the fish thereon during its travel into the said tunnel entrance.

2. In a fish canning machine, the combination of a feeding tunnel, an intermittently movable carrier for advancing fish into said tunnel, a cutter adapted for operation transversely of the line of travel of said carrier during its rest period to cut the fish into can lengths, and means associated with said carrier and with said cutter for holding the fish on the carrier during its travel into said tunnel and for holding the fish in said tunnel during said cutting.

3. In a fish canning machine, the combination of a feeding tunnel, a carrier having an intermittent forward movement for advancing fish into the entrance end of said tunnel, a cutter adapted for operation transversely of the line of travel of said carrier during its rest period to cut the fish into can lengths, reciprocating and rocking means adapted to rock inwardly and engage the fish on said carrier and to move forward therewith for holding the fish thereon during its travel into the said tunnel entrance, and pressure means for holding the fish during the rest period of said carrier while the same is being cut into can lengths by said cutter.

4. In a fish canning machine, the combination of a feeding tunnel, an intermittently movable carrier for advancing fish into the entrance end of said tunnel, a cutter adapted for operation transversely of the line of travel of said carrier during its rest period to cut the fish into can lengths, holding fingers associated with said carrier and movable into the fish carried thereon for holding the same on said carrier, and means for advancing said fingers simultaneously with the advancement of the fish.

5. In a fish canning machine, the combination of a feeding tunnel, an intermittently movable carrier for advancing fish into the entrance end of said tunnel, a cutter adapted for operation transversely of the line of travel of said carrier during its rest period to cut the fish into can lengths, fingers movable with said carrier when the latter advances the fish into said tunnel for holding the fish thereon, and means for holding the fish in said tunnel entrance on both sides of said cutter during the cutting operation.

6. In a fish canning machine, the combination of a feeding tunnel, an intermittently movable carrier for advancing fish into the entrance end of said tunnel, a cutter adapted for operation transversely of the line of travel of said carrier during its rest period to cut the fish into can lengths, a reciprocating slide associated with said carrier and movable on its forward feed stroke in unison with the advancement of said carrier, and fingers pivotally mounted on said slide and movable into the fish on said carrier when said slide is in its rear position, said fingers thereafter holding the fish during its movement into said tunnel.

7. In a fish canning machine, the combination of a feeding tunnel, a feeding trough communicating with the entrance end of said tunnel, an intermittently movable carrier chain operating in said trough for advancing fish into said tunnel, fingers associated with said trough and having reciprocating movement, the forward stroke of which is in unison with the step advance of said carrier chain and the fish carried thereby, and means for rocking said fingers into fish holding position preparatory to the advance movement of said carrier chains.

8. In a fish canning machine, the combination of a feeding tunnel, a feeding trough communicating with the entrance end of said tunnel, an intermittently movable carrier chain operating in said trough for advancing fish into said tunnel, a cutter adapted for operation transversely of the line of travel of the said carrier chain during its rest period to cut the fish into can lengths, fingers associated with said trough and having reciprocating movement parallel to the movement of said carrier chain and the fish carried thereby, means for rocking said fingers into fish holding position preparatory to the advance movement of said carrier chain, and yielding means interposed between said fingers and said rocking means for insuring their individual fish engaging and holding positions.

9. In a fish canning machine, the combination of a feeding tunnel, a feeding trough communicating with the entrance end of said tunnel, an intermittently movable carrier chain operating in said trough for advancing fish into said tunnel, a plurality of rocking and reciprocating fingers arranged on opposite sides of said trough and adapted to move into the same and to engage the fish on said carrier chain when rocked inwardly, and means for holding said fingers on the engaged fish while they advance on a forward step of their reciprocation and with said carrier chain during the fish feeding movement.

10. In a fish canning machine, the combination of a feeding tunnel, a feeding trough communicating with the entrance end of said tunnel, an intermittently movable carrier chain operating in said trough for advancing fish into said tunnel, a cutter adapted for operation transversely of the line of travel of said carrier chain during its rest period to cut the fish into can lengths, a plurality of fingers arranged on opposite sides of said trough and adapted to move into the same and engage the fish therein and to hold the fish on said carrier chain during its advance movement, and means associated with said tunnel and said trough for holding the fish during its cutting by said cutter.

11. In a fish canning machine, the combination of a table gate for supporting fish preparatory to cutting, a feeding tunnel, an intermittently movable carrier chain for advancing fish into the entrance end of said tunnel, means for moving said table gate to effect feeding of fish supported thereby into said movable carrier, and a cutter adapted for operation transversely of the line of travel of said carrier during its rest period to cut the fish into can lengths.

12. In a fish canning machine, the combination of a table gate for supporting fish preparatory to cutting, a feeding tunnel, an intermittently movable carrier for advancing fish into said tunnel, means for moving said table gate to permit dropping of fish supported thereby onto said movable carrier, a cutter adapted for operation transversely of the line of travel of said carrier during its rest period to cut the fish fed thereby into can lengths, and yieldable elements associated with said gate and with said gate moving means for nullifying the action of the latter on said gate during abnormal fish feeding condition.

13. In a fish canning machine, the combination of a feeding tunnel, a feeding trough communicating with the entrance end of said tunnel, table gates located in said trough and adapted to support fish to be canned, an intermittently movable carrier chain operating in said trough and passing beneath said table gates for advancing fish into said tunnel, means for operating said table gates to transfer the fish supported thereby onto said carrier chain while the latter is on its rest period, and fingers associated with said trough for holding the fish on said carrier chain during its advancement into said tunnel.

14. In a fish canning machine, the combination of a feeding tunnel, table gates mounted adjacent said tunnel and adapted to support fish to be canned, an intermittently movable carrier chain adapted to pass beneath said table gates and having spikes for advancing fish into said tunnel, means for operating said table gates when said carrier chain comes to rest to drop the fish onto said chain, fingers movable into engagement with the fish after it has dropped from said gates for impaling the fish on the spikes of said chain, and a cutter located alongside of said tunnel and adapted for operation transversely of the line of travel of said carrier chain for cutting the fish held on the spikes of said chain during its rest period.

15. In a fish canning machine, the combination of a feeding tunnel, a feeding trough communicating with the entrance end of said tunnel, an intermittently movable carrier chain operating in said trough for advancing fish into said tunnel entrance, means moving simultaneously with said carrier chain for holding the fish thereon during its advance movement, clamping means operating in said tunnel entrance and engaging the fish introduced therein by said carrier chain for holding it during the rest period of the chain, a cutter adapted for operation transversely of the line of travel of said carrier to cut said held fish into can lengths, and yielding devices associated with said clamping means for adapting it to the size of the fish so held.

16. In a fish canning machine, the combination of a feeding tunnel, an intermittently movable carrier for advancing fish into the entrance end of said tunnel, a table gate for supporting fish preparatory to cutting in said tunnel, a cutter adapted for operation tranversely of the line of travel of said carrier during its rest period to cut the fish into can lengths, and means for moving said table gate to effect transfer of fish supported thereby into said movable carrier and at predetermined intervals which are synchronized with said cutting action.

17. In a fish canning machine, the combination of a feeding tunnel, an intermittently movable carrier chain for advancing fish into said tunnel, a cutter adapted for operation transversely of the line of travel of said carrier during its rest period, table gates located adjacent said tunnel for supporting fish preparatory to cutting, and means for moving said table gates to supply said movable carrier with fish, each gate movement being made after said cutter has performed a predetermined number of cutting operations on the fish successively introduced in said tunnel.

18. In a fish canning machine, the combination of a feeding tunnel, an intermittently movable carrier for advancing fish into said tunnel, a cutter adapted for operation transversely of the line of travel of said carrier during its rest period to cut the fish into can lengths, means for feeding fish into said carrier at predetermined intervals relative to said cutting action, and adjusting means for changing the operation interval of said fish feeding means.

19. In a fish canning machine, the combination of a feeding tunnel, an intermittently movable carrier for advancing fish into the entrance end of said tunnel, a cutter adapted for operation transversely of the line of travel of said carrier during its rest period to cut the fish into can lengths, means moving simultaneously with said carrier for holding the fish thereon during its travel into the zone of cutting, pressure members associated with said tunnel and operating after the fish has been brought into the entrance end of the tunnel for holding the same in position for cutting, and a feeding fork for transferring the cut fish from said tunnel entrance and along said tunnel.

20. In a fish canning machine, the combination of a feeding tunnel, an intermittently movable carrier for advancing fish into the entrance end of said tunnel, a cutter adapted for operation transversely of the line of travel of said carrier during its rest period to cut the fish into can lengths, a feeding fork for transferring the cut fish from said tunnel entrance after cutting, means for lowering said fork in behind said cut fish and thence advancing it forward to effect said transfer and also for imparting a backward movement to said fork to clear the incoming fish during cutting, and a dash pot unit associated with said feeding fork for compensating pressure variance set up against said fork by the cut fish in said tunnel.

WALTER E. ROONEY.